Patented Nov. 15, 1949

2,488,502

UNITED STATES PATENT OFFICE 2,488,502

STYRENE EMULSION POLYMERIZATION PROCESS

Harold F. Park, East Longmeadow, and Costas H. Basdekis and Ralph I. Dunlap, Jr., Springfield, Mass., assignors to Monsanto Chemical Company, St. Louis, Mo., a corporation of Delaware No Drawing. Application December 5, 1946, Serial No. 714,136

2 Claims. (Cl. 260—93.5)

This invention relates to polystyrene. More particularly, the invention relates to a process for the emulsion polymerization of monomeric styrene.

The polymerization of styrene in aqueous emulsion, though long known, has been beset with many difficulties. Long washing procedures have been necessary to produce a clear, homogeneous polymer. The necessary addition of coagulants to the emulsions has increased the cost of the process and the coagulated particles have been difficult to wash and dry. Further, the coagulated particles have been difficult to handle in molding operations and the molded pieces produced therefrom have been relatively poor from the standpoint of strength, clarity, heat resistance and ageing resistance.

It is an object of this invention to provide an improved process for the emulsion polymerization of styrene.

A further object is to provide, by an emulsion process, polystyrene having improved clarity, strength, and heat and ageing resistance.

These and other objects are attained by polymerizing a mixture of monomeric styrene, emulsifying agent, modifying agent, catalyst and buffer under specific operating conditions and using critical ranges of the various ingredients.

The following example is given in illustration and is not intended as a limitation on the scope of this invention. Where parts are mentioned, they are parts by weight.

EXAMPLE

The following three solutions were made up separately:

Solution A:                                 Parts
  Monomeric styrene_____ 100
  Dodecyl mercaptan_____  0.25
  Acto 450 (sodium salts of mahogany
    acids) _____ 0.2
Solution B:
  Water _____ 200
  Acto 450_____  0.2
Solution C:
  Water _____ _____       15
  Potassium persulfate_____   0.1
  Sodium bicarbonate_____   0.07

Solution B was placed in a suitable container and heated under refluxing conditions at atmospheric pressure for about 10 minutes to expel dissolved and occluded air. Solution C was divided into five approximately equal portions and one portion added to solution B at the end of the initial reflux period. Thereafter, solution A was added to solution B slowly over a period of about one hour. The remaining portions of solution C were added to solution B at approximately fifteen minute intervals during the addition of solution A. After all of the ingredients had been incorporated, the reaction was continued for about 15 minutes. Throughout the entire procedure, the reaction medium was heated at reflux temperature at atmospheric pressure, i. e., from about 90° C. to about 95° C.

The contents of the reaction vessel were continuously agitated during the polymerization process, the agitation being controlled to prevent turbulent movement of the liquids. During the polymerization reaction, the pH of the medium varied between about 5 and about 6. At the end of the process, a stable, aqueous emulsion of polymerized styrene was obtained which was then dried directly in a drum drier. It was not necessary to coagulate the emulsion prior to the drying step. The polystyrene obtained was in the form of flakes which could be easily molded under heat and pressure to yield articles which were clear and free from haze.

The particular formulation used, the method of forming the emulsion and the polymerization process present many critical phases which must be accurately controlled to obtain a polymerized product having good moldability and physical properties.

One of the least critical aspects is the ratio of styrene to water which may be varied from 1:1 to 1:10. The final emulsion may be further diluted with water if desired.

The emulsifying agents which may be used are ammonium or alkali metal salts of sulfonated organic compounds for example, sodium salts of alkylated aryl sulfonates, dibutyl phenyl phenol sodium disulfonate, monobutyl phenyl phenol sodium monosulfonate, monoethyl phenyl phenol potassium monosulfonate, sodium salts of alkyl naphthalene sulfonic acids, isobutyl naphthalene sodium sulfonate, isopropyl naphthalene sodium sulfonate, sodium salts of sulfonated hydrocarbons, sodium salts of alkyl polyether sulfonates, sodium salts of sulfonated lignin, sodium tetrahydronaphthalene sulfonate, etc. In place of the sodium salts, ammonium salts or salts of other alkali metals such as lithium, potassium, rubidium, and cesium may be used. A mixture of two or more emulsifying agents may be used. The amount of emulsifying agent used is restricted to a range of from about 0.05 part to about 2.0 parts per 100 parts of monomeric styrene. If more than 2.0 parts of emulsifying agent is used, the resulting emulsion must be coagulated and the coagulant washed out to obtain a clear polymer stable to heat and ageing. It has further been found particularly advantageous to divide the emulsifying agent between the water and the styrene monomer prior to starting the polymerization. This may be varied by using as little as 10% up to about 60% of the emulsifying agent in the water with the remainder being incorporated in the styrene monomer.

The modifying agent shown in the example, dodecyl mercaptan, may be substituted, in whole or in part, by other mercaptans having from 4 to 20 carbon atoms in the alkyl chain, e. g., decyl mercaptan, lauryl mercaptan, butyl mercaptan, amyl mercaptan, tertiary-butyl mercaptan, tertiary-amyl mercaptan, tertiary-dodecyl mercaptan, octyl-dodecyl mercaptan, tertiary-hexyl mercaptan, tertiary-heptyl mercaptan, tertiary-octyl mercaptan, tertiary-tetradecyl mercaptan, tertiary-hexadecyl mercaptan, etc. Mixtures of the mercaptans may be used. The amount of modifying agent may be varied according to properties desired in the final product. For commercial molding powders the preferred range is from about 0.025 to about 0.35 part per 100 parts of styrene monomer. The modifier may be added to the styrene monomer or to the water prior to the start of the polymerization reaction. It also may be divided between the water and the styrene. Further, it may be added to the polymerization reaction gradually during the course of the polymerization or step-wise during polymerization.

The potassium persulfate catalyst used in the example may be replaced by certain other well-known catalysts including sodium perborate, hydrogen peroxide, acetyl peroxide, and other catalysts which are soluble in water and have an oxidation reduction potential of less than −1.5. Such well-known catalysts as benzoyl peroxide, lauroyl peroxide, di(tertiary butyl) peroxide, etc. are, for practical purposes, insoluble in water and can not be used even though their oxidation reduction potential is less than −1.5 since their use in the present process produces polymers greatly inferior to those made with the preferred catalysts. The catalyst is preferably dissolved in water together with the buffer but separately from the monomeric styrene and emulsifying agent. The catalyst solution is then added to the polymerizing medium either continuously or at intervals during the addition of styrene monomer. It can also be added directly to the water solution of emulsifying agent prior to addition of styrene monomer.

Sodium bicarbonate is used in the example as hydrogen ion acceptor to maintain the pH of the reaction at about 5 to 6. Other materials such as buffers including disodium hydrogen phosphate, sodium acetate, sodium citrate, potassium formate, etc., which will maintain the pH of the polymerization between about 4.5 to about 6.5 may be used. The nature and amount of hydrogen ion regulating medium used will depend somewhat on the catalyst used especially on the acidity of the decomposition products of said catalyst. However, catalyst and hydrogen ion acceptor must be so chosen that the amount of hydrogen ion acceptor needed will be less than about 0.5 part per 100 parts of styrene and the amount may be as small as 0.002 parts if a catalyst such as hydrogen peroxide is used. If the air, e. g., under a carbon dioxide atmosphere, the lower range of hydrogen ion acceptors may be used.

The temperature of the polymerization process of this invention may be varied between about 60° C. and the temperature of reflux at atmospheric pressure. However, the speed of the reaction is considerably greater at the reflux temperature and the product obtained is not adversely affected by the use of said temperature, so that the preferred process is to use the reflux temperature at atmospheric pressure which is from about 90° C. to about 100° C. The time necessary to complete the polymerization by the process of this invention will vary with the temperature and with the rate of addition of the various ingredients. Generally, the polymerization may be completed in from about ½ hour to about 5 hours after all ingredients have been incorporated.

It has been found that the amount of agitation imparted to the polymerizing mixture is extremely critical for producing an emulsion of the polymer which may be direct dried. The agitation must be fast enough to completely mix all ingredients but must be slow enough to prevent the development of surface turbulence. For example, an anchor stirrer, revolving at 60 R. P. M. in a 100 gallon glass lined autoclave yields a smooth emulsion. Increasing the R. P. M. to 300 causes coagulation of the polymer into a viscous paste which is difficult to disintegrate and dry. If larger vessels and vessels of different shapes are used, the type of agitating blade and speed of agitation must be varied to obtain optimum conditions. But, in any case, the agitation must be slow enough to prevent surface turbulence and yet must cause a thorough intermingling of the ingredients.

The polymer obtained by the process of this invention contains less than 1% and generally less than 0.5% of the impurities known as "methanol solubles" which contribute materially to poor heat and weathering resistance. The molecular weight of the polymer is equivalent to that of the best polymers made for molding processes by the mass polymerization methods. Products molded from the polymer have higher impact strength and show a greater deflection than products molded from a comparable mass polymer. In the table is set forth the physical prop- Table I

|  | Mass Polymer | Emulsion Polymer |
| --- | --- | --- |
| Molecular Weight | ca. 70,000 | ca. 70,000 |
| Flexural Strength, p. s. i | ca. 11,000 | 13,400 |
| Deflection, inches of gage | 0.130 | 0.220 |
| Impact Strength, V-notched bar, ft. lbs./in. bar | 1.3 | 1.7 |
| Heat Distortion, °C | 78 | 87 |
| Methanol Solubles, percent | 3.5 | 0.5 |

The process of this invention provides an extremely rapid method for obtaining an emulsion polymer of styrene which may be direct dried to yield polymeric styrene having physical properties superior even to those of polymers made by mass polymerization. In contrast to the usual emulsion polymers of styrene which can only be molded under extreme conditions and which even then tend to yield poor moldings having flow lines, check marks, poor weld lines, etc., the polymers made by the process of this invention may be molded easily at normal molding temperatures to give clear moldings free from imperfections.

lubricants, and fillers, etc. may be added to the polymer prior to molding. If the additives used do not affect the polymerization process they may be dispersed in the monomer before polymerization.

It is obvious that many variations may be made in the process and products of this invention without departing from the spirit and scope thereof as defined in the appended claims.

What is claimed is:

1. The process which comprises polymerizing 100 parts of styrene in aqueous emulsion in conjunction with (1) from 0.005 to 0.4 part of potassium persulfate, (2) from 0.01 to 0.4 part of a sodium salt of mahogany acids, (3) from 0.003 to 0.5 part of sodium bicarbonate and (4) from 0.025 to 0.35 part of dodecyl mercaptan, said process including the steps of dividing the sodium salt of mahogany acids between the water and the styrene monomer prior to mixing the same, maintaining the water at reflux temperature at atmospheric pressure while gradually adding the styrene monomer to the water, adding the sodium bicarbonate and potassium persulfate dissolved in water in small increments to the refluxing mixture, agitating the refluxing mixture throughout said steps at a rate insufficient to cause surface turbulence, and continuing the heating at reflux temperature after the final addition of the monomer to complete the polymerization.

2. A process which comprises polymerizing 100 parts of monomeric styrene in conjunction with

| | Parts |
|---|---|
| Dodecyl mercaptan | 0.25 |
| Sodium salt of mahogany acids | 0.4 |
| Potassium persulfate | 0.1 |
| Sodium bicarbonate | 0.07 | said process including the steps of dividing the sodium salt of mahogany acids equally between the monomeric styrene and the water prior to mixing the same, heating the water solution of the sodium salt of mahogany acids at refluxing temperature at atmospheric pressure for 10 minutes, adding the monomeric styrene containing the sodium salt of mahogany acids slowly to the refluxing water solution over a period of one hour while maintaining the solution at reflux temperature, dissolving the potassium persulfate and sodium bicarbonate in water, and adding the solution thus formed in five successive portions to the water solution at intervals of fifteen minutes, agitating the refluxing mixture throughout the process at a rate insufficient to cause surface turbulence of the polymerizing medium, continuing the heating at reflux temperature and atmospheric pressure for fifteen minutes after the final addition of said ingredients, and recovering the polymerized styrene from the emulsions thus produced by direct drying.

HAROLD F. PARK.
COSTAS H. BASDEKIS.
RALPH I. DUNLAP, JR.

REFERENCES CITED

The following references are of record in the file of this patent:

Lange, "Handbook of Chemistry," pages 915–916, (1941).

Certificate of Correction

Patent No. 2,488,502 November 15, 1949

HAROLD F. PARK ET AL.

It is hereby certified that error appears in the printed specification of the above numbered patent requiring correction as follows:

Column 4, line 49, strike out the syllable and hyphen "prop-" and insert instead *properties of moldings made from a polymer produced by the emulsion process of this invention compared to moldings made from a mass polymer.*;

and that the said Letters Patent should be read with this correction therein that the same may conform to the record of the case in the Patent Office.

Signed and sealed this 7th day of March, A. D. 1950.

[SEAL]

THOMAS F. MURPHY,
*Assistant Commissioner of Patents.*